US012456266B2

(12) United States Patent
Jywe et al.

(10) Patent No.: US 12,456,266 B2
(45) Date of Patent: Oct. 28, 2025

(54) OPERATION ASSISTANCE SYSTEM

(71) Applicant: National Taiwan University, Taipei (TW)

(72) Inventors: Wen-Yuh Jywe, Taipei (TW); Tung-Hsing Hsieh, Taipei (TW); Shang-Kai Liao, Taipei (TW); Yung-Chuan Huang, Taipei (TW); Ruo-Heng Wang, Taipei (TW)

(73) Assignee: National Taiwan University, Taipei (TW)

( * ) Notice: Subject to any disclaimer, the term of this patent is extended or adjusted under 35 U.S.C. 154(b) by 189 days.

(21) Appl. No.: 18/137,452

(22) Filed: Apr. 21, 2023

(65) Prior Publication Data

US 2024/0303936 A1   Sep. 12, 2024

(30) Foreign Application Priority Data

Mar. 6, 2023   (TW) .................... 112108159

(51) Int. Cl.
*G06T 19/00*     (2011.01)
*G02B 27/01*     (2006.01)
*G06V 30/224*    (2022.01)

(52) U.S. Cl.
CPC ........ *G06T 19/006* (2013.01); *G02B 27/0172* (2013.01); *G06V 30/2247* (2022.01); *G06T 2219/024* (2013.01)

(58) Field of Classification Search
CPC ............ G06T 19/006; G06T 2219/024; G02B 27/0172; G06V 30/2247
See application file for complete search history.

(56) References Cited

U.S. PATENT DOCUMENTS

| | | | | |
|---|---|---|---|---|
| 6,065,017 A * | 5/2000 | Barker | ............... | G06F 11/1402 |
| 6,484,276 B1 * | 11/2002 | Singh | ................... | G06F 11/263 |
| | | | | 714/38.14 |
| 8,914,472 B1 * | 12/2014 | Lee | ...................... | G06Q 30/04 |
| | | | | 709/219 |
| 10,366,521 B1 * | 7/2019 | Peacock | ............... | G02B 27/017 |
| 10,846,899 B2 * | 11/2020 | Pokorny | ............... | G06F 3/0304 |
| 10,866,631 B2 * | 12/2020 | Nguyen | ................. | G06F 3/016 |

(Continued)

OTHER PUBLICATIONS

Jywe, Wen-Yuh et al, "Establishing MR digital maintenance guidance system applied on Hololens and HMDs", 39th National Conference of Chinese Society of Mechanical Engineers, Dec. 2&3, 2022.

(Continued)

*Primary Examiner* — Motilewa Good-Johnson

(57) ABSTRACT

An operation assistance system can collect on-site data and perform fault diagnosis analysis to provide an operational guidance for helping users to operate a subject device. In the operation assistance system, a user device is configured to observe the subject device, capture live video, and simultaneously display visual aids. The monitor device is coupled to the subject device to monitor various sensor states of the subject device to determine a fault status. The server is coupled to the user device and the monitor device, providing visual aids to the user device based on the fault status. The user device is also configured to allow the wearer to perceive the visual aids displayed as in a specific relative position in the space where the subject device is located.

15 Claims, 6 Drawing Sheets

(56) References Cited

U.S. PATENT DOCUMENTS

| | | | | |
|---|---|---|---|---|
| 10,880,163 | B2* | 12/2020 | Lairsey | G06T 19/006 |
| 10,915,436 | B2* | 2/2021 | Copty | G06F 11/3688 |
| 11,032,603 | B2* | 6/2021 | Mullins | G06T 19/006 |
| 11,074,730 | B1* | 7/2021 | Nunez | H04L 41/0654 |
| 11,122,164 | B2* | 9/2021 | Gigante | H04N 7/142 |
| 11,200,742 | B1* | 12/2021 | Post | G06T 19/003 |
| 11,216,656 | B1* | 1/2022 | Zia | G06N 3/04 |
| 11,227,439 | B2* | 1/2022 | Bridgeman | G06T 19/006 |
| 11,265,513 | B2* | 3/2022 | Schmirler | G06T 19/006 |
| 11,373,372 | B2* | 6/2022 | Keselman | G06N 5/022 |
| 11,734,213 | B2* | 8/2023 | Nixon | H04L 69/08 710/5 |
| 12,283,003 | B2* | 4/2025 | Althobaiti | H04N 21/2187 |
| 2008/0088877 | A1* | 4/2008 | Cacenco | G06F 8/70 358/1.17 |
| 2014/0317577 | A1* | 10/2014 | Chen | G06F 3/011 715/863 |
| 2015/0206353 | A1* | 7/2015 | Grasso | G06T 19/006 345/633 |
| 2016/0171772 | A1* | 6/2016 | Ryznar | G02B 27/017 345/633 |
| 2016/0253563 | A1* | 9/2016 | Lam | H04L 63/08 348/130 |
| 2016/0350595 | A1* | 12/2016 | Solomin | G06V 20/20 |
| 2018/0089349 | A1* | 3/2018 | Rezgui | G06F 40/137 |
| 2018/0165978 | A1* | 6/2018 | Wood | G06T 19/006 |
| 2018/0190020 | A1* | 7/2018 | Mullins | G06N 7/01 |
| 2018/0324229 | A1* | 11/2018 | Ross | G06F 3/1423 |
| 2019/0103037 | A1* | 4/2019 | Lussier | G09B 19/0069 |
| 2020/0117336 | A1* | 4/2020 | Mani | F25B 49/005 |
| 2020/0184217 | A1* | 6/2020 | Faulkner | G06T 7/50 |
| 2020/0311397 | A1* | 10/2020 | Sawhney | G06V 10/40 |
| 2023/0068660 | A1* | 3/2023 | Brent | G06F 9/453 |
| 2023/0324891 | A1* | 10/2023 | Crawford | G05B 19/41865 700/100 |
| 2023/0326143 | A1* | 10/2023 | Althobaiti | H04N 21/4312 |
| 2024/0303936 | A1* | 9/2024 | Jywe | G02B 27/0172 |

OTHER PUBLICATIONS

Jywe, Wen-Yuh et al, "Establishing MR digital maintenance guidance system applied on HoloLens and HMDs", the 19th International Conference on Automation Technology (Automation 2022), Nov. 11-13, 2022, Kaohsiung, Taiwan.

Jywe, Wen-Yuh et al, "Application of MR Precision Post-Sales Services for CNC Components", Insight Machinery Magazine, vol. 8, Issue1, Jan. 2023.

* cited by examiner

OPERATION ASSISTANCE SYSTEM

CROSS-REFERENCE TO RELATED APPLICATION

This application claims the priority of Taiwanese patent application No. 112108159, filed on Mar. 6, 2023, which is incorporated herewith by reference.

BACKGROUND OF THE INVENTION

1. Field of the Invention

The present invention relates generally to a remote support system, and particularly, to a system that uses virtual reality technology for remote assistance operations.

2. The Prior Arts

Nowadays, factories pay more attention to equipment maintenance and repair. When equipment malfunctions, minor issues can be repaired by referring to paper troubleshooting manuals, while more serious issues may require engineers to repair n site, which can be time-consuming and costly. Especially in the post-epidemic era, when engineers are forbidden to travel around, the shortage of technical resources in factories slows down the progress of problem-solving. As enterprises gradually focus on carbon reduction issues, how to achieve remote assistance and help customers troubleshoot problems online is an issue that needs to be addressed. In many known solutions attempted to achieve remote assistance services, it is necessary to integrate technologies from multiple different fields, including IoT (Internet of Things), artificial intelligent (AI), mixed reality (MR), augmented reality (AR), and the 5th generation telecommunication network (5G). The technical bottleneck is significantly difficult to breakthrough when the cross-domain know hows are critical in implementing the aforementioned solutions. It is therefore desirable to develop a feasibly working solution that can effectively provide remote assistant services with low-cost multi-domain technology combinations.

SUMMARY OF THE INVENTION

Therefore, the present invention provides an operation assistance system which offers guidance to a subject device. This solution integrates technologies from various fields, including IoT, AI, MR, AR, and 5G mobile communication network. It is divided into four parts to be addressed separately: collecting on-site data, performing fault diagnostic analysis, conducting preliminary troubleshooting through AR digital guidance, and executing advanced processing through MR remote expert collaboration.

The embodiment of the operation assistance system mainly includes at least a user device, an intelligent monitor device, and a server. The user device comprises a wearable display that can observe the subject device, capture live video, and simultaneously display supporting video. The wearable display may be a head-mounted display. The intelligent monitor device can be coupled to the subject device to monitor the status of multiple sensors of the subject device to determine a fault state. The server is coupled to the user device and the intelligent monitor device and can provide supporting video to the user device based on the fault state. In addition, the user device is also configured to allow a wearer to proprioceptively perceive the supporting video displayed at a specific relative position in the space where the subject device is located.

In a further embodiment, the operation assistance system also includes a device controller coupled to the server and can be coupled to the subject device through a specific communication protocol. The device controller is used to receive status information of the subject device to be displayed through the user device, or forward the control command issued by the user device to the subject device. The specific communication protocol may be Open Platform Communications Unified Architecture (OPCUA), or Message Queuing Telemetry Transport (MQTT) protocol.

In a further embodiment, the user device is further configured to transmit live video to the server. The server is equipped with image recognition function to identify the image of the subject device in the live video so as to determine the model or the fault status thereof.

In a further embodiment, when the user device displays the visual aids, it can also interactively play, replay, rewind, jump, open related documents, change display position or depth, zoom in and out, or select different visual aids.

In a further embodiment, the intelligent monitor device is also configured to monitor the current, vibration, temperature, humidity, and physical condition of the subject device. The intelligent monitor device is also set up to perform machine learning based on the monitored results of the subject device to determine the fault state.

In a further embodiment, the operation assistance system also comprises an object database, a document database, and a workflow database. The object database can store a variety of component models, including the component model of the subject device. The document database can store text files in a specific format, including operating instructions for the subject device. The workflow database can store multiple procedure scripts that define the operational steps for corresponding subject devices operated in various scenarios, along with relevant component models and document files required in the operational steps.

In another embodiment, the server further comprises a processor module coupled to the object database, the document database, and the workflow database, capable of executing a procedure script in the workflow database based on the fault state, and referring to the object database and the document database to generate the visual aids.

In a further embodiment, the operation assistance system further comprises a mixed reality editing system, coupled to the object database, the document database, and the workflow database, comprising a component editor module, a document editor module, and a workflow design module. The component editor module comprises a component model editing user interface (UI). The document editor module comprises a text file editing UI. The workflow design module comprises a procedure script editing UI.

In a further embodiment, the object database further comprises object information of the subject device including name, specification, production serial number, image, and two-dimensional barcode. The component editor module is further arranged to be capable of editing the object information of the subject device.

In a further embodiment, the document database further comprises fault messages, alarm codes, and sensor status descriptions of the subject device, and the document editor module can edit such fault messages, alarm codes, and sensor status descriptions of the subject device.

In a further embodiment, the workflow script in the workflow database contains a sequential list of operational instructions, each of which includes one or more of the following: instruction text, device 3D model, example video, example picture, and document file. The workflow design module can also edit each operational instruction in the workflow script.

In a further embodiment, the operation assistance system further comprises a support device, coupled to the server, for establishing a video conference with the user device through the server to provide guidance information thereto upon request. The operation assistance system further comprises an online collaboration module, coupled to the component editor module, the document editor module, and the workflow design module, for providing an instant interaction interface capable of generating guidance information in real-time during the video conference.

In a further embodiment, the server is further arranged to be capable of superimposing the on-site video and the guidance information into a mixed reality image, and providing the mixed reality image to one or more participants of the video conference.

In a further embodiment, the support device obtains the on-site video captured by the user device through the video conference. The support device utilizes the online collaboration module to annotate the guidance information in a virtual space. The guidance information comprises one or more of the following: component models, rectangles, circles, and arrows base on the object database, freehand drawing, and text.

In a further embodiment, the user device is further configured to sense an on-site coordinate system and depth information of the on-site video. The online collaboration module is further configured to allow customized position and depth when annotating the guidance information. The user device receives the guidance information through the video conference, and superimposes the on-site coordinate system with the coordinate of the virtual space, causing the guidance information to be proprioceptively displayed to the wearer at a specific relative position in the on-site space.

In a further embodiment, the user device is further configured to recognize a two-dimensional barcode on the subject device in the on-site video as a reference point of the on-site coordinate system.

In a further embodiment, when the video conference is concluded, the server is further configured to convert recordings of the video conference and the guidance information into a new procedure script to be stored in the workflow database. The intelligent monitor device is capable of recording sensor value changes in the subject device during the video conference, and using a machine learning algorithm to learn new fault state correlations.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE PREFERRED EMBODIMENT

The following embodiments of the present invention are illustrated by specific examples, those skilled in the art may easily understand other advantages and efficacy of the present invention from the content disclosed in this specification. The present invention may also be implemented or applied by different specific embodiments, the details of the present specification may also be based on different views and applications, without departing from the spirit of the present invention to carry out various modifications or changes.

Figure 1:
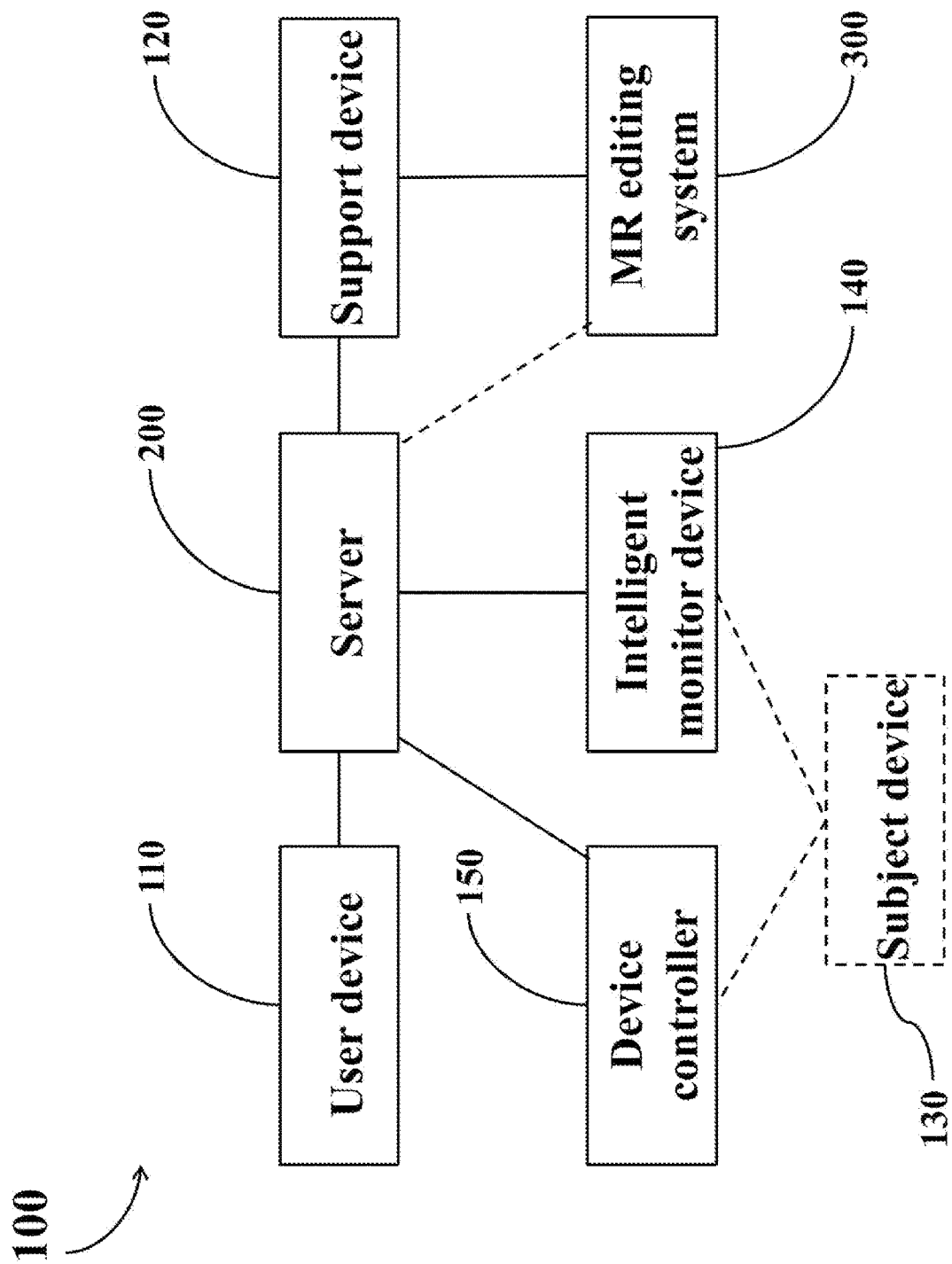
FIG. 1 shows an operational support system architecture according to an embodiment of the present invention.

FIG. 1 is a diagram of the structure of the operation assistance system 100 according to the present embodiment. In the present embodiment, the operation assistance system 100 is used to provide operational guidance to a subject device 130, so that a user (not shown) can obtain operational guidance through the user device 110 without the need for on-site assistance from manufacturer service personnel. In this embodiment, the subject device 130 actually refers to any hardware product that requires manual operation or testing, which can generally be understood as various machines, tools, or instrument equipment in the factory. Usually, the subject device 130 has some commonly used transmission interfaces in the industry, supports specific transmission protocols, and has some basic sensor components built in to provide basic sensing data. The specific data type is not limited herein. The present embodiment can reasonably perform relevant analysis and processing based on the data that the subject device 130 can provide.

In this embodiment, the user device 110 is a wearable display. More specifically, the user device 100 can be a head-mounted displays with augmented reality (AR) function. The user device 110 may have a see-through display, allowing the user to observe the subject device 130 directly while displaying visual aids provided by the server 200, creating a head-up display (HUD) effect. This enables the user to conveniently refer to instructional visual aids while operating the subject device 130. The user device 110 may also have one or more cameras and microphones for capturing on-site video. It can be understood that in this embodiment, the on-site video referred to not only includes image signals, but also sound signals captured on-site.

The user device 110 in this embodiment is also known as a Mixed Reality Client (MR Client). Through the user device 110, the user can obtain at least the following functions, including: standard process digital guidance, MR remote collaboration, IoT information examination, intelligent detection, and recognition.

The standard process digital guidance function works as follows. The server 200 can obtain information about the fault status of the subject device 130 according to inputs from the user device 110, the intelligent monitor device 140, or the device controller 150. When the subject device 130 (machine under test) issues an alarm or the intelligent monitor device 140 detects a fault, the server 200 can notify the user by sending a message through communication software such as LINE or Telegram. At this point, the user can connect to the server 200 through the user device 110. The server 200 can then search the object database 230, the document database 240, and the workflow database 250 to find the pre-stored corresponding troubleshooting tutorial materials to be displayed on the user device 110. The user can then follow the guidance information provided by the server 200 and try to troubleshoot step by step. If this method is unsuccessful in solving the problem, an expert mode can be triggered by directly calling remote service personnel through the server 200 for online teaching. In the expert mode, the remote service personnel can utilize the support device 120 to connect to the user device 110 through the server 200, and perform the remote collaboration to assist the user using the MR technology. In summary, the server 200 can assist the user in either unmanned mode or expert mode.

The MR remote collaboration function works as follows. The user device 110 can perform remote voice calls, remote annotating, and remote collaboration through the server 200 and the support device 120. The support device 120 is typically operated by a device expert or customer service personnel to manually provide support services from remote. The user device 110 can display text, images, videos, PDFs, and even data on the expert's desktop provided through the support device 120, allowing the user of the user device 110 to effectively obtain various information required to solve problems. The user device 110 is also configured to allow the wearer to perceive the visual aids displayed in a specific relative position in an on-site space where the subject device is located. In other words, the user device 110 implements mixed reality technology, allowing the user to see virtual image in the appropriate position in the real-world view.

The IoT information examination function works as follows. The User device 110 can view information about the subject device 130, or control the subject device 130 through certain IoT communication protocols. For example, the operation assistance system 100 may further comprise a device controller 150 coupled to the server 200 and the subject device 130, transmitting information therebetween using certain IoT communication protocols. The device controller 150 may be able to receive status information from the subject device 130 via the IoT communication protocol, which is then converted to a format that can be displayed on the user device 110 with the help of server 200. The device controller 150 may also be able to forward control commands issued by the user device 110 to the subject device 130. In this embodiment, the said communication protocols can be Open Platform Communications Unified Architecture (OPCUA) or Message Queuing Telemetry Transport (MQTT) protocol. In other words, the operation assistance system 100 disclosed herein allows the user device 110 to read device information from the subject device 130 via the server 200, while taking control of the subject device 130.

In FIG. 1, the operation assistance system 100 further includes an intelligent monitor device 140, which can be coupled to the subject device 130, monitoring various sensor statuses in the subject device 130 to determine a fault state. For example, the intelligent monitor device 140 can monitor electrical currents, vibration, temperature, humidity, and physical state of the structure of the subject device 130, and perform machine learning based on the monitored results to determine the fault state. In this embodiment, the intelligent monitor device 140 can be an AI node with machine learning capabilities, constructed with an industrial computer and an application chip, for collecting various data sensed from the subject device 130. The intelligent monitor device 140 can also be combined with hyperparameter automatic adjustment function to replace time-consuming traditional modeling methods. Thus, the intelligent monitor device 140 not only improves overall modeling efficiency and accuracy of the working products and related component health diagnosis system, but also reduces the occurrence of line stoppages caused by failures in the production line. In further applications, the intelligent monitor device 140 can also be designed to support the fifth-generation mobile communication network, directly connect with relevant system vendors to update the AI modules over the air (OTA), such that the difficulty in maintaining and updating the system by the end users is overcome.

The server 200 is the operational core of the operation assistance system 100 in this embodiment. When the intelligent monitor device 140 reports a fault state to the server 200, the server 200 can provide visual aids corresponding to the problem to the user device 110 based on the fault state. To facilitate learning, when the user device 110 displays the visual aids, it can also accept playback commands feedback from the user device 110, rendering the playback of the visual aids interactive. For example, the server 200 can support playback commands such as progressive play, replay, rewind, skip, open relevant documents, change display position or depth, zoom in/out, or choose other visual aids. The operation assistance system 100 typically includes human-machine interfaces such as gesture recognition, joysticks, touchpads, keyboards, or mice for the above interactive operations.

Figure 2:
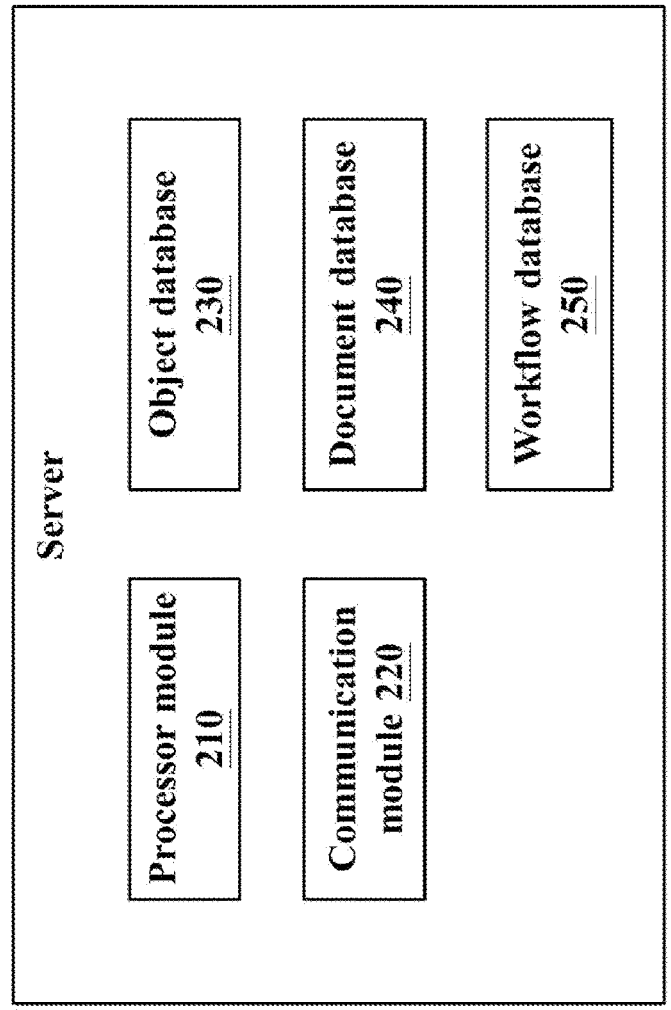
FIG. 2 depicts a server architecture according to an embodiment of the present invention.

FIG. 2 is a schematic diagram of the architecture of server 200 according to an embodiment of the present invention. The server 200 can be understood as a hardware system or a computer that runs a specific operating system and software. In practice, the server 200 may include a communication module 220 that supports at least the TCP and UDP communication protocols, and is not limited to wired or wireless networks. The TCP communication protocol can be used to manage connection handshake, message delivery (dialing, hanging up, receiving, tagging, etc.), and database storage between server 200 and user device 110. The UDP communication protocol can be used for real-time video, audio transmission, and includes a device information conversion platform that can display device fault information through user device 110.

The connection between the user device 110 and the server 200 can be wireless, wired, or other proprietary interfaces. The user device 110 can transmit on-site video captured by the camera to the server 200. The on-site video is received through the communication module 220, and thereafter analyzed and processed by the processor module 210 in the server 200. The server 200 may have an image recognition function, and the processor module 210 can recognize the image of the subject device 130 in the on-site video by referring to the data in the object database 230, and determine the model number or fault state of the subject device 130. For example, after the user device 110 sends image data to the server 200 in real-time, the processor module 210 uses the You Only Look Once (YOLO) deep learning algorithm to analyze the model, and then determines the model number or fault-related information of the subject device 130. The analysis results are returned to the user device 110 for display in the form of text or images. The processor module 210 disclosed in this embodiment can be understood as a processor, a computer chip, or an application-specific chip, which, together with memory, runs software or firmware to drive the server 200 and implement all the above-mentioned functions.

To complete the functionality of the server 200, an object database 230, a document database 240, and a workflow database 250 are arranged in the server 200. The functions of each database are described as follows.

The object database 230 can store various component models. In this embodiment, the component model can be a three-dimensional object unit of various shapes, such as a sphere, cube, cone, plane, or curved surface. In practice, various subject devices 130 of different models on the market can be disassembled into combinations of multiple three-dimensional object units. Through these combinations of three-dimensional object units, easy understandable reference images can be generated, facilitating users to understand the operating principles of the physical subject device 130. In the case that the original factory data is available, the component models in the object database 230 can also include realistic models of the subject device 130. In further embodiments, the processor module 210 in the server 200 should be able to create a clone model of the subject device 130 based on the on-site video image provided by the user device 110, and store it in the object database 230.

The document database 240 can store text files in specific formats, including operation instructions for the subject device 130. The document database 240 can be used to collect various known tutorial documents and step-by-step instructions as content materials for providing visual aids. The format of the text files is not limited to known formats such as doc, pdf, or txt.

The workflow database 250 can store multiple procedure scripts, which define various operational procedures of various subject devices under various operational scenarios, along with various component models and document files involved in each operational procedure. In practice, the procedure scripts are mainly used to describe one or more steps required to solve a particular fault scenario. Each step usually contains text, images, 3D object models, sound, and even video. Therefore, the procedure scripts can use a format similar to Hypertext Transfer Protocol (HTTP), Extensible Markup Language (XML), or other commonly used descriptive methods to collate various object documents in the object database 230 and the document database 240 into a script file by external links. The processor module 210 executes the script file to generate an interactive visual aid, which is displayed on the user device 110 for the user to see.

In summary, the processor module 210 in the server 200 is coupled to the object database 230, document database 240, and workflow database 250. When the server 200 executes a procedure script in the workflow database 250 based on a fault state, the visual aids are generated based on the object database 230 and the document database 240. As a supplementary note, a procedure script in this embodiment can be regarded as a combination of a series of instructions that define multiple steps, including the display of screens, contents, or sounds for each step. The generated visual aids can be a result of executing the series of instructions. With the MR technology, the visual aids in this invention is able to present the movement, disassembly, and component details of 3D objects, serving as a convenient tool for users to learn how to operate the device.

Figure 3:
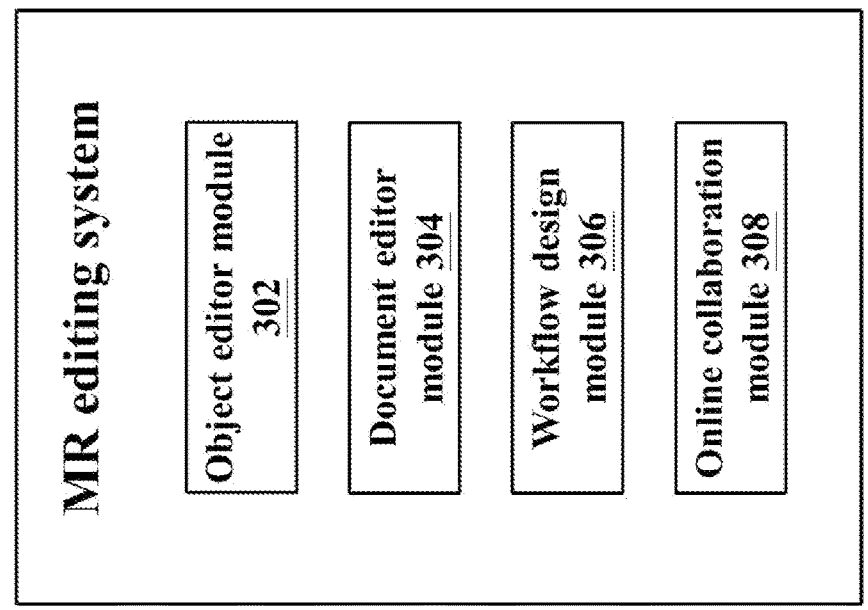
FIG. 3 shows a mixed reality editing system architecture according to an embodiment of the present invention.

FIG. 3 is a schematic diagram of the mixed reality (MR) editing system 300 according to an embodiment of the present invention. The MR editing system 300 can be a standalone hardware or a computer executing specific software. The MR editing system 300 can be a device independent of the server 200, or a module integrated in the server 200. The main purpose of the MR editing system 300 is to provide various objects, documents, and procedures required for the operation of the server 200, and to provide a real-time operable human-computer interface for users of the user device 110 and service personnel of the support device 120 to perform an online virtual reality interaction.

In other words, the MR editing system 300 can be understood as a human-machine interface for editing the objects involved in a mixed virtual reality world. The MR editing system 300 operates in conjunction with the object database 230, the document database 240, and the workflow database 250 to obtain complete functionality. The MR editing system 300 can be roughly divided into several modules based on the editing function requirements, such as the component editor module 302, the document editor module 304, and the workflow design module 306. The component editor module 302 includes a user interface for drawing a component model. The document editor module 304 includes a user interface for editing a text file. The workflow design module 306 includes a user interface for designing a procedure script.

The object database 230, in addition to storing various basic component models, may further store object information related to the subject device 130, such as name, specification, production serial number, image, and two-dimensional barcodes. The aforementioned information can be created by the component editor module 302. That is, the component editor module 302 can be used to edit the name, specification, production serial number, image, and two-dimensional barcode of the subject device 130.

In this embodiment, the component editor module 302 is not only capable of drawing 2D models but also 3D models. The 2D models are used for basic drawing, such as common basic shapes like rectangles, circles, and arrows. The 3D models may be in the fbx or obj file format. After users or experts draw various component models using the component editor module 302, they may then be stored in the object database 230 via the server 200.

The document database 240 shown in FIG. 2 not only collects various teaching documents, but may also be used to collect application codes related to the subject device 130, such as fault messages, alarm codes, and sensor status descriptions. These messages collected by the document database 240 can also be managed by the document editor module 304 shown in FIG. 3, including creation, modification, and deletion. After the user or expert uses the document editor module 304 to edit the fault messages, alarm codes, and sensor status descriptions of the subject device 130, the data is stored in the document database 240 through the server 200. This data can be read and utilized in subsequent operations related to the subject device 130. For example, an expert may use the support device 120 to connect to the server 200, operate the document editor module 304 to freely edit the machine trouble shooting guide, equipment sensor and controller information, input the text, pictures, videos, and PLC points into a step-by-step disassembling guide, and then store the result in the document database 240.

The procedure scripts in the process database 250 shown in FIG. 2 comprise a series of operational instructions, each of which includes one or more of the following: instruction text, three-dimensional device diagram, sample video, sample image, and document file. These messages can be edited and generated in a hyperlink manner by the workflow design module 306 in conjunction with the component editor module 302 and the document editor module 304 shown in FIG. 3. For example, an expert or customer service personnel of the subject device 130 can use the MR editing system 300 to edit standard operating procedures (SOPs), machine failure repair information, and equipment sensor and controller information in advance. The resulting product obtained after editing is then correspondingly stored in the object database 230, the document database 240, and the process database 250 in the server 200. When an expert of the subject device 130 operates the support device 120, MR head-mounted displays may be adapted as one of the working solutions. After an expert of the subject device 130 connects to the server 200 via the support device 120, the MR editing system 300 can be accessed online. When the expert of the subject device 130 helps the user of the user device 110 through the support device 120, the camera and microphone of the MR head-mounted display may be used for audio and video communication with the user. The video conference-related API can be included in the support device 120 for serializing or deserializing voice and video content, which are then sent to the user device 110 through the server 200. The technical details of online video conferencing or audio and video communication can refer to known techniques. However, the embodiment of the invention is advantageous for the incorporations of mixed reality functionality in the online video conference.

To implement mixed reality in the embodiment, the MR editing system 300 also provides an online collaboration module 308 as a real-time interactive human-machine interface. In the implementation, the online collaboration module 308 of this embodiment may call the component editor module 302, the document editor module 304, and the workflow design module 306 to collaboratively perform functions to provide a variety of materials for drawing screens in real time. It will be understood that if the MR editing system 300 can be connected online to the object database 230, the document database 240, and the workflow database 250, it may provide more comprehensive editing functions. In summary, during video conference, the online collaboration module 308 provides a human-machine interface that can generate guidance information in real time. Regarding the appearance design and layout of the human-machine interface, considering user habits, it may be customized based on the design of various well-known art editing software to reduce the learning curve of the operation interface.

When an expert of the subject device 130 interacts with the support device 120 and the user device 110, the online collaboration module 308 can be operated through MR glasses to remotely mark the on-site image captured by a user. When the user using the user device 110 consults the expert at the support device 120, the information marked by the expert from the remote location can be seen on the display interface of the user device 110. Moreover, through the mixed reality technology introduced in this invention, the content drawn by the expert can be overlaid with the physical object of the user device 110 at the on-site location to form a mixed virtual reality, which may facilitate the user's understanding of the teaching content.

The following is an example of the process of remote annotation. First, a user of the user device 110 calls for online customer service or remote experts through the server 200 to request the establishment of an online meeting to provide operational guidance for the subject device 130. The support device 120 may be coupled to the server 200 via the network. When the user device 110 issues a video conference request, the server 200 matches and connects the user device 110 to the support device 120 to establish a video conference, wherein the support device 120 is the device used by the remote expert. Through the video conference, remote experts may use the support device 120 to provide guidance information to the user device 110.

The support device 120 obtains the on-site video captured by user device 110 through video conferencing, and the remote expert may use the online collaboration module 308 to annotate the guidance information in a virtual space. The guidance information can include component models in the object database 230, or various default basic templates such as rectangles, circles, arrows, freehand drawings, and text. In one embodiment, when the expert uses the support device 120, a desired object to be added can be found from the object database 230 through the MR editing system 300, and the position to be displayed in the user device 110 can be specified by dragging and dropping. In another embodiment, the expert may remotely upload desired guidance information to the server 200 by placing a 3D component model at a designated position in the virtual space, adjusting scaling ratios, and adjusting rotation angles through the online collaboration module 308. Therefore, the information uploaded to server 200 not only includes the 3D component model itself, but also annotation parameters such as coordinates of position, rotation angle, and scaling ratio.

The view displayed on the support device 120 is a mixed reality view that overlays the virtual space onto the on-site video because the online expert is not present at the site of the user device 110, allowing the expert to accurately annotate guidance information on the on-site video from remote. To implement mixed reality, the video captured by the camera of the user device 110 is sent to the server 200 via an API. The camera of the user device 110 can be designed as a stereo camera, and the on-site video sensed therefrom may include an on-site coordinate system and depth information. Therefore, when the support device 120 displays the on-site video, the expert can also perceive a stereo image. When the expert uses the online collaboration module 308 to remotely annotate the guidance information, the action can be understood as drawing in a virtual space corresponding to the on-site coordinate system, wherein the position and depth of the drawn object can be freely adjusted. For example, when the expert uses the MR editing system 300 to remotely implement remote annotation functionality, the server 200 may assign depth data to the content of the annotated image based on the position data of the camera matrix of the user device 110, combined with the ray tracing algorithm, to achieve a 3D stereoscopic annotation effect. In the end, the guidance information entered through the MR editing system 300 by the remote expert or customer service personnel using the support device 120 may be displayed on the screen of the user device 110. For example, a user device 110 participating in the video conference may receive guidance information from the support device 120 through the server 200, and overlay the on-site coordinate system with the coordinate of the virtual space, so that the wearer is able to proprioceptively perceive the guidance information displayed at a specific relative position in the on-site space.

In one embodiment, a video conference may also allow multiple people to connect at the same time, conduct voice calls, to perform remote annotation, to perform remote collaboration, and to see in the glasses text, pictures, videos, PDFs, and other data sent by the expert.

In further embodiments, the server 200 may combine a Generative Adversarial Network (GAN) to train AI robots with guidance experience entered by remote experts through the support device 120. After appropriate training, the AI robot can replace remote experts and interact with users online, provide guidance and help troubleshoot issues with subject device 130 in basic scenarios. Conversely, users may also provide feedback during conversations with the AI robot to cumulate the experiences, so as to enhance the server 200 service capabilities.

To seamlessly integrate the on-site space of the user with the virtual space in which the remote expert works into a mixed reality, the concept of coordinate alignment is proposed. At a specific location on each subject device 130, one or more specific symbols, such as a 2D barcode, can be marked. When the camera of the user device 110 captures on-site video, if a 2D barcode is recognized on the subject device 130, the user device 110 can determine the model of the subject device 130 and establish a coordinate system for the on-site space. The user device 110 can determine the relative reference point or origin of the coordinate system based on the position of the 2D barcode on the subject device 130. When overlaying the mixed reality image, the user device 110 may determine how to overlay the virtual space based on the coordinate system of the on-site space.

Figure 4:
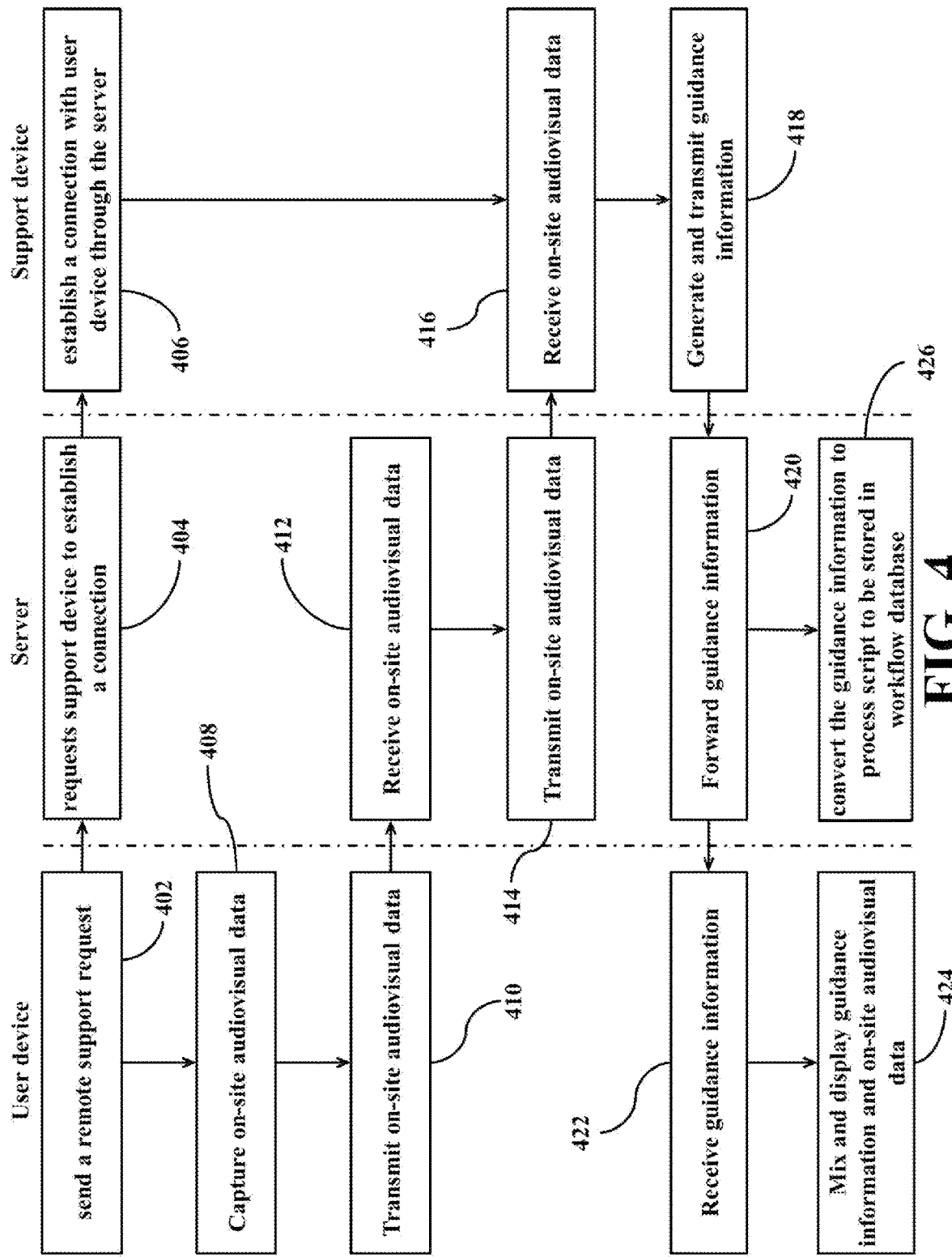
FIG. 4 is a flowchart of a remote support method according to an embodiment of the present invention.

FIG. 4 is a flowchart of a remote support method for one of the embodiments of the present invention. The operation assistance system 100 of FIG. 1 can operate in expert mode to provide online support services to the user device 110 through the support device 120 via the server 200.

Firstly, in step 402, the user device 110 sends a remote support request to the server 200. The remote support request may also include information related to the subject device 130, such as its model number, fault situation, and various sensor data.

In step 404, after receiving the remote support request, the server 200 sends a connection request to the support device 120. The server 200 can simultaneously maintain connections with multiple support devices 120, that is, to provide multiple remote experts for line standby support. When the server 200 receives the remote support request, it may then match one of the online remote experts according to criteria information attached with the remote support request, so as to establish a remote support connection.

In step 406, after receiving the connection request from the server 200, an operator of the support device 120 interacts with the user of the user device 110 via a video conference.

In step 408, a camera and a microphone in the user device 110 capture the on-site audiovisual data at the user end. The user device 110 may be a MR head-mounted display, and the on-site audiovisual data captured may include the subject device 130. If the camera of the user device 110 has a stereo detection function, such as LIDAR, the on-site audiovisual data produced may be a panoramic picture with depth information.

In step 410, the captured on-site audiovisual data is transmitted from the user device 110 to the server 200. The information transmitted from the user device 110 to the server 200 may also include voice or additional information related to the subject device 130, such as a 2D barcode on the subject device 130.

In step 412, the server 200 receives the captured on-site audiovisual data from the user device 110. The server 200 may also perform preliminary recognition on the on-site audiovisual data to determine the specifications or fault situation of the subject device 130.

In step 414, the server 200 sends the captured on-site audiovisual data to the support device 120. The server 200 may also send the recognition results of the on-site audiovisual data or any additional information provided by the user device 110 to the support device 120, so that the operator of the support device 120 can understand the actual situation at the user device 110 end.

In step 416, the support device 120 receives the on-site audiovisual data transmitted by the server 200 and displays it on its own monitor. The support device 120 may also be a MR head-mounted display or VR head-mounted display, allowing the operation personnel of the support device 120 to perceive the panoramic picture of the on-site audiovisual data of the user device 110.

In step 418, according to the on-site audiovisual data observed, the operation personnel of the support device 120 performs remote annotation with the MR editing system 300 of FIG. 3. The information generated by the remote annotating is guidance information that can help the user of the user device 110 solve problems. It can be understood that the content provided by the remote expert through this video conference can also include voice dialogue or other files sent online.

In step 420, the server 200 receives the guidance information provided by the support device 120 and forwards it to the user device 110.

In step 422, the user device 110 receives the guidance information forwarded from the server 200. As described in the embodiment of FIG. 3, the content of the guidance information can be component models, patterns, text, and sound depicted in a virtual space.

In step 424, the guidance information is mixed and displayed on the on-site audiovisual data captured by the user device 110, forming a mixed reality effect.

In step 426, during the video conference, the server 200 may also convert the guidance information into a new process script and store it in the workflow database 250. When any similar fault situation is occurred in the future, the server 200 may directly employ the ready-made process script from the workflow database 250 to provide lecturing materials to the user, such that the labor cost of the operator of the support device 120 is reduced.

Figure 5:
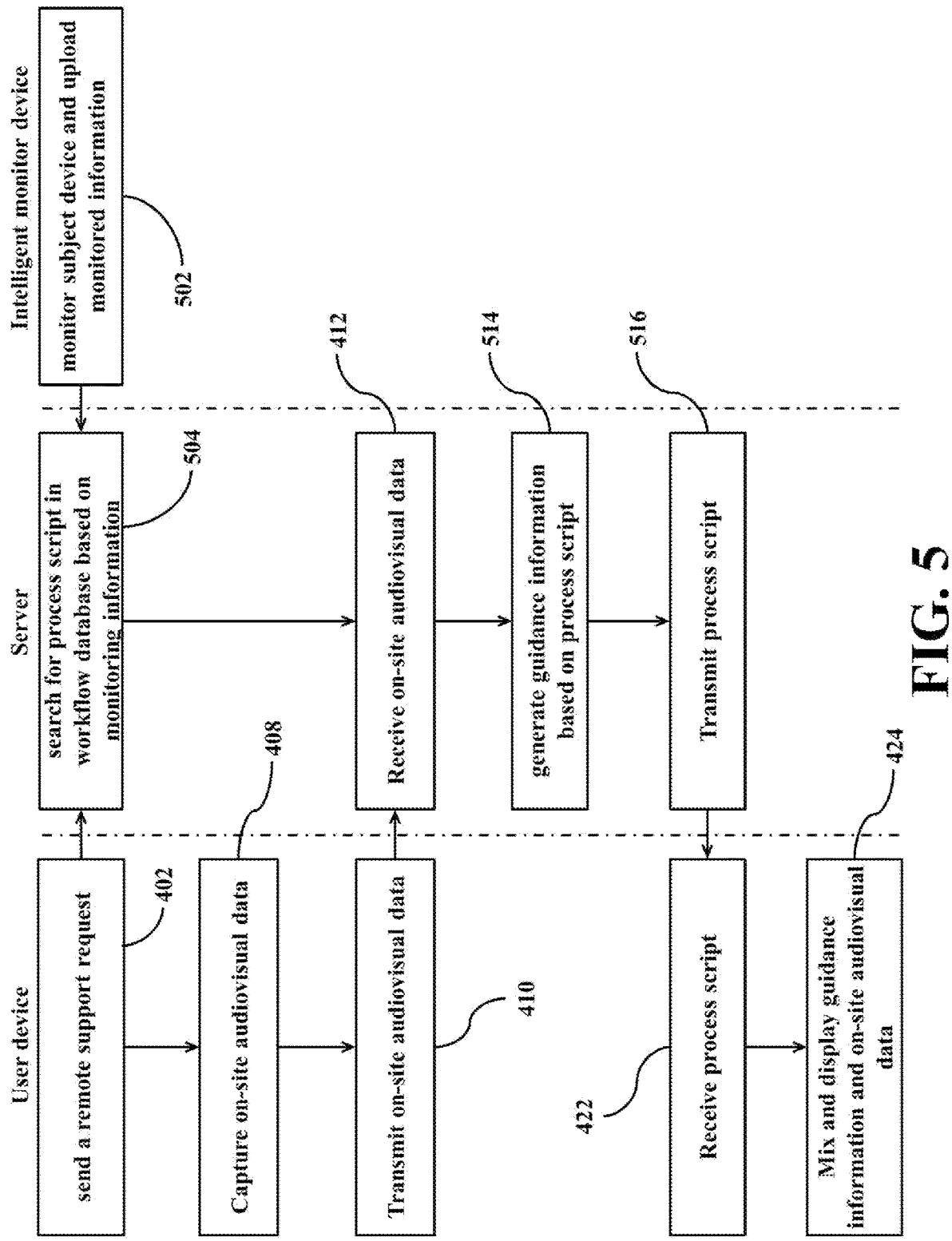
FIG. 5 is a flowchart of a remote support method according to a further embodiment of the present invention.

FIG. 5 is a flowchart of a remote support method according to another embodiment of the present invention. When a user encounters difficulties in operating the subject device 130, the user may choose to request an existing online process tutorial provided by the server 200, instead of finding a remote expert for online teaching. When the server 200 accumulates enough knowledge, in the long run, intelligent online process tutorials will gradually replace human teachers. The process in FIG. 5 is described as follows.

First, in step 402, the user device 110 sends a remote support request to the server 200. The remote support request may also include information related to the subject device 130, such as model, fault status, and various sensor data.

While step 402 is processed, the intelligent monitor device 140 executes step 502 to monitor the subject device 130 and upload monitored information to the server 200. The subject device 130 itself usually has some sensors and transmission interfaces supporting IoT protocols, which can report various sensor statuses and execution codes to the intelligent monitor device 140. The intelligent monitor device 140 may further include more types of sensing devices to collect more detailed operational information about the subject device 130. These monitored information can be used by the server 200 as a basis for determining the fault status. In addition, the intelligent monitor device 140 itself may also have intelligent learning capabilities to actively determine the fault status of the subject device 130 based on the monitored information, and report the fault status to the server 200.

In step 504, after receiving the remote support request from the user device 110, the server 200 searches for the corresponding process script in the workflow database 250 based on the monitored information provided by the intelligent monitor device 140.

Steps 408 to 412 are analogous to the embodiment in FIG. 4 and are not repeated herein.

Step 514 runs after step 412, and the server 200 generates guidance information based on the process script found in the workflow database 250. In practice, the process script can be written in a markup language to describe the text, graphics, and sound that should be displayed in multiple steps, and can refer to various material data sources stored in the object database 230, document database 240, and workflow database 250. The guidance information can be a video synthesized by the processor module 210 in the server 200 according to the process script, including various text, graphics, and sound referenced in the process script. The guidance information can even have 3D depth information and be presented as panoramic images in the user device 110.

In step 516, the server 200 transmits the guidance information to the user device 110.

Steps 422 to 424 are like the embodiment in FIG. 4 and are not repeated herein.

In a derivative embodiment, the user device 110 may accept user interaction while playing back the guidance information. That is, a user may input commands during the playback process to make the guidance information progressively played, paused, or replayed. Furthermore, the user may also provide feedbacks during the playback process, allowing the server 200 to learn the repair experience of the subject device 130. Furthermore, the intelligent monitor device 140 continuously monitors sensor value variations on the subject device 130 while the user operates the subject device 130, such that the repair situation is consolidated as material for continuously expanding the machine learning capability.

Figure 6:
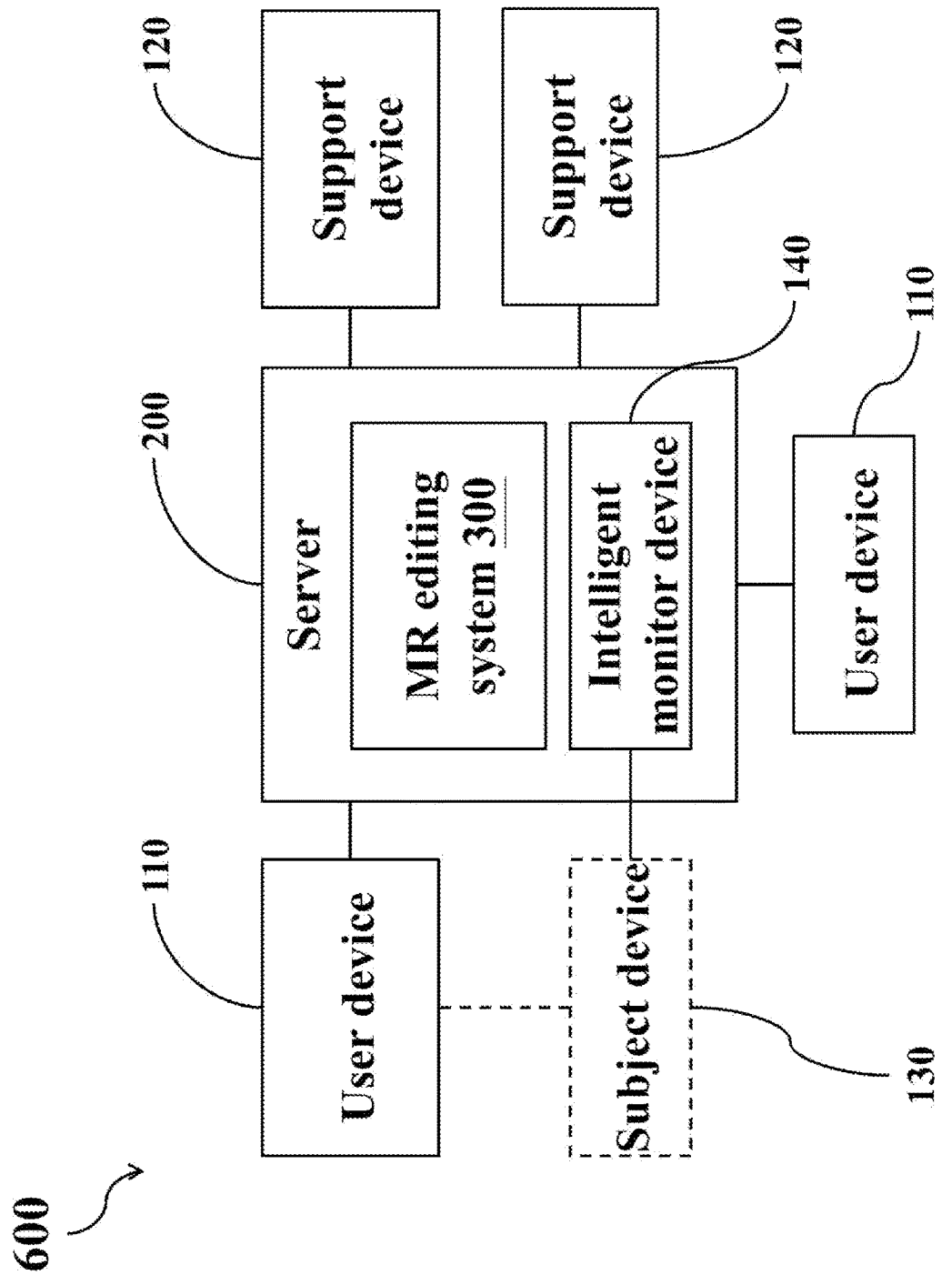
FIG. 6 shows an operational support system architecture according to a further embodiment of the present invention.

FIG. 6 is a schematic diagram of the structure an operation assistance system 600 according to an embodiment of the present invention. The main structure comprises the user device 110, the server 200, and the supporter device 120. The operation assistance system 100 in FIG. 1 illustrated as a distributed architecture. In the operation assistance system 600 of this embodiment, the MR editing system 300 can be integrated into the server 200 and provided to the supporter device 120 as an online application service. The intelligent monitor device 140 shown in FIG. 1 can also be integrated into the server 200 and connected to the subject device 130 via the IoT communication protocol.

In another derivative embodiment, the device controller 150 in FIG. 1 may be implemented as part of the intelligent monitor device 140. The intelligent monitor device 140 may communicate bi-directionally with the subject device 130, simultaneously receiving sensor information while delivering control commands.

In another derivative embodiment, the intelligent monitor device 140 may be integrated into the subject device 130 and communicate with the server 200 through an IoT communication protocol or a 5G mobile network communication protocol.

Furthermore, in the architecture of the operation assistance system 600, the server 200 may simultaneously connect to multiple user devices 110 or multiple support devices 120. The server 200 may provide same copy of online guidance to multiple user devices 110. One or more operators of the support devices 120 may also provide online guidance to one or more user devices 110 simultaneously. The users who do not operate the subject device 130 may also be able to participate in the online conference through corresponding user devices 110 to observe others' mixed reality screens for learning. In other words, the server 200 may further overlay the on-site video of the subject device 130 and the guidance information into a mixed reality screen, which is then provided to multiple other user devices 110 in the video conference.

In the implementation of the operation assistance system 600, the server 200 itself may possess basic process teaching functions. When the user of the user device 110 encounters a problem, they may first request the server 200 to provide a workflow tutorial without using the support device 120. When the information provided by the server 200 is insufficient to solve the problem, the user of the user device 110 may then call a remote expert through the server 200 to go online and assist with the problem using the support device 120.

In summary, the operation assistance system 100 presented in the present invention includes the following innovative concepts. The intelligent monitor device 140 is integrated into the operation assistance system 100, operably capable of diagnosing faults, configuring thresholds, and issuing abnormal notifications to the subject device 130. The arrangement of the intelligent monitor device 140 also enables real-time transmission of fault diagnosis information. The architecture designed in the embodiment has expandable flexibility and can be quickly integrated into third-party systems. The example in FIG. 3 proposes a convenient human-machine interface that allows operators to quickly edit an AR process within 10 minutes. The communications between the user device 110, the server 200, and the subject device 130 may follow standard communication protocols such as MQTT and OPCUA, thereby reducing implementation costs and increasing future system compatibility.

In addition, since the operation assistance system 100 of this invention involves various technologies in different fields, such as IoT, TCP, VR, and etc., the server 200 of this embodiment may function as a platform for converting related equipment standard communication protocols, making information integration smooth. Based on the information provided by the user devices 110 and 140, the server 200 of the embodiment can intelligently filter the corresponding fault SOP processing flow of the subject device 130 from the database. The server 200 may further integrate into various presently well-known cloud platforms, maximizing the performance of data access at the lowest cost. The server 200 in the application also integrates a MR editing system 300 that may design SOP processes and IoT information, making the functionality extensible with the type of the subject device 130.

The operation assistance system 100 of the present invention integrates video calling and remote annotation functions into mixed reality technology, which is an unprecedented innovation. In further embodiments, each of the components in the operation assistance system 100 may be connected to a 5G mobile communication network, expanding the service range to various corners of outdoor, construction site, urban or rural areas, no longer limited to office or laboratory.

The operation assistance system 100 of the present invention is expected to feature multiple advantages as follows. The services provided by the operation assistance system 100 can effectively reduce the cost of production caused by faults and the labor cost of regular inspections. The arrangement of the intelligent monitor device 140 can reduce paper processes, reduce a large amount of meter reading, and automatically record sensing information to the cloud. The intelligent monitor device 140 intelligently manages the components, and determines the cause of the fault based on available information. The server 200, together with the support device 120, can reduce travel costs and avoid movement. Since various databases are created in the server 200, it is also convenient for users to quickly check the relevant information of the subject device 130, such as production history. Since the operation assistance system 100 of the present invention integrates mixed reality technology, the technical threshold for maintaining the subject device 130 is significantly reduced, and the maintenance efficiency can be effectively improved, the safety coefficient of maintenance and operation can be improved, and the product service interruption rate can be reduced. In the process of troubleshooting using the operation assistance system 100, the server 200 may adopt AI technology to interpret real-time images, or take photos to quickly identify complex information.

The present invention can be applied in a wide range of industries. For example, the manufacturing industry is a type of industry that requires on-site operations. If there is a shortage of technical support personnel in the factory, the problem-solving service would be slowed down. In recent years, the government has continuously advocated ESG (Environmental, Social, and Governance) responsibility governance, which has raised gap to operate the factories. The operation assistance system 100 proposed by the present invention, which combines IoT, AI, MR/AR, and 5G mobile communication networks, can help companies achieve various long-term and short-term goals more quickly. The solution combined with head-mounted displays can significantly improve the efficiency of manufacturers, reduce travel costs, and increase the speed of talent training, and further reduce the carbon footprint that sales and talent training may produce. The intelligent monitor device 140 incorporating IoT and AI technologies can also help reduce energy consumption. Manufacturers can understand the current performance through monitoring and formulate policies to improve energy-intensive work. The present invention may help companies keep up with the trend of ESG, improve industrial efficiency, and reduce cost expenditures through the architecture of the operation assistance system 100.

The operation assistance system 100 of the present invention can also be positioned in digital precision after-sales service applications. For example, the after-sales service cost of a certain original machine tool industry may account for more than 20% of the total cost. If the operation assistance system 100 of the present invention is adopted, the cost of purchasing after-sales service can be reduced to less than 10% of the total cost.

The operation assistance system 100 of the present invention may also be applied in the wind power industry, such as remote inspection operations for offshore wind facilities. Through the functions of image recognition and voice input, the time required for inspection personnel is reduced from the original 2 hours to about 1 hour, and the efficiency of inspection and maintenance is significantly improved.

The intelligent monitor device 140 in this invention may collaborate with telecommunication companies to upload the collected data and diagnostic results to the telecommunication company's cloud platform. The cloud platform can then distribute all information to each user device 110 in the operation assistance system 100. In other words, the server 200 can be deployed on the cloud platform, providing a restful API for other components in the operation assistance system 100 to remotely connect to. Finally, the sales of the operation assistance system 100 may also directly use the sales channels provided by the telecommunication company to promote to various industries.

It should be noted that in this document, the terms "comprising", "including", or any other variants thereof are intended to encompass non-exclusive inclusion, so that a process, method, article, or device comprising a series of elements includes not only those elements but also includes other elements that are not explicitly listed, or are inherently present in the process, method, article, or device. Unless otherwise limited, the terms "including a . . . " do not exclude the presence of additional identical elements in the process, method, article, or device that includes the element specified.

The embodiments described above in conjunction with the figures are purely illustrative and not restrictive, and those skilled in the art can make many forms without departing from the spirit and scope of the present invention as disclosed herein and as protected by the claims. In accordance with the term table and previous context, the general technical personnel in this field may make many forms under the disclosure of the present invention without departing from the purpose and scope of the present invention and the scope protected by the claims.

What is claimed is:

1. An operation assistance system, adaptable for providing operational guidance to a subject device, comprising:
   a user device, comprising a wearable display, capable of observing the subject device, capturing on-site video, and simultaneously displaying visual aids, the visual aids being interactive with the subject device for providing a positional reference for a wearer in relation to the subject device to perform interactive operations;
   an intelligent monitor device, coupled to the subject device, arranged to monitor statuses of multiple sensors related to the subject device to determine a fault state and cause of the fault state;
   an object database, configured to store a plurality of component models, and comprising a component model of the subject device;
   a document database, configured to store text files of predetermined formats, and including operation manuals for the subject device;
   a workflow database, configured to store a plurality of procedure scripts, wherein the procedure scripts describe operational steps for the subject device in various operational scenarios including operational steps for solving a particular fault scenario, along with relevant component models and document files required in the operational steps; and
   a server, coupled to the user device and the intelligent monitor device, the server comprising a processor module coupled to object database, the document database, and the workflow database, executing a procedure script in the workflow database based on the fault state, and inferencing the object database and the document database to generate the visual aids and provide the visual aids to the user device based on the fault state;
   wherein the user device is further configured to allow the wearer to proprioceptively perceive the visual aids displayed in a specific relative position in an on-site space where the subject device under test is located using an on-site coordinate system and depth information.

2. The operation assistance system as claimed in claim 1, further comprising a device controller, coupled to the server and configured to be connected to the subject device via a specific communication protocol, for receiving status information from the subject device to be displayed on the user device, or forwarding a control command issued from the user device to the subject device, wherein the specific communication protocol comprises an Open Platform Communications Unified Architecture (OPCUA), or a Message Queuing Telemetry Transport (MQTT) protocol.

3. The operation assistance system as claimed in claim 1, wherein:
the user device is further configured to transmit the on-site video to the server; and
the server is further configured with image recognition capability, capable of recognizing an image of the subject device from the on-site video to determine a model number or the fault state of the subject device.

4. The operation assistance system according to claim 1, wherein:
when displaying the visual aids, the user device provides the following functions: interactive or progressive play, replay, rewind, and skip, display of relevant documents, adjustment of display position or depth, zooming in/out, and selection of different visual aids.

5. The operation assistance system according to claim 1, wherein: the intelligent monitor device is further configured to monitor electrical current, vibration, temperature, humidity, and structural physical state of the subject device; and the intelligent monitor device is further configured to perform machine learning based on monitor results of the subject device to determine the fault state.

6. The operation assistance system as claimed in claim 1, further comprising a mixed reality editing system, coupled to the object database, the document database, and the workflow database, comprising:
a component editor module, comprising a component model editing user interface (UI);
a document editor module, comprising a text file editing UI; and
a workflow design module, comprising a procedure script editing UI for editing the operational steps in the procedure scripts, each operational step including operation instructions comprising at least one of three-dimensional device diagram, sample video, sample image, and document file in addition to instructional text.

7. The operation assistance system according to claim 6, wherein:
the object database further comprises object information of the subject device comprising name, specification, production serial number, image, and two-dimensional barcode; and
the component editor module is further arranged to be capable of editing the object information of the subject device.

8. The operation assistance system according to claim 6, wherein:
the document database further comprises status information of the subject device comprising fault messages, alarm codes, and sensor status descriptions; and
the document editor module is arranged to be capable of editing the status information of the subject device.

9. The operation assistance system according to claim 6, wherein:
the procedure script in the workflow database comprises a series of consecutive step-by-step operation instructions; and
the workflow design module is arranged to be capable of editing each operation instruction in the procedure script.

10. The operation assistance system as claimed in claim 6, further comprising:
a support device, coupled to the server, arranged to establish a video conference with the user device via the server upon request from the user device, to provide guidance information to the user device; and
an online collaboration module, coupled to the component editor module, the document editor module, and the workflow design module, and arranged to provide an instant interaction interface for generating guidance information in real time during the video conference.

11. The operation assistance system as claimed in claim 10, wherein:
the server is further arranged to be capable of superimposing the on-site video and the guidance information into a mixed reality image, and providing the mixed reality image to one or more participants of the video conference.

12. The operation assistance system as claimed in claim 10, wherein:
the support device obtains the on-site video captured by the user device through the video conference;
the support device utilizes the online collaboration module to annotate the guidance information in a virtual space; and
the guidance information comprises one or more of the following: component models, rectangles, circles, and arrows base on the object database, freehand drawing, and text.

13. The operation assistance system as claimed in claim 12, wherein:
the user device is further configured to sense the on-site coordinate system and depth information of the on-site video;
the online collaboration module is further configured to allow customized position and depth when annotating the guidance information; and
the user device receives the guidance information through the video conference, and superimposes the on-site coordinate system with a coordinate of the virtual space, causing the guidance information to be proprioceptively displayed to the wearer at a specific relative position in the on-site space.

14. The operation assistance system as claimed in claim 13, wherein:
the user device is further configured to recognize a two-dimensional barcode on the subject device in the on-site video as a reference point of the on-site coordinate system.

15. The operation assistance system as claimed in claim 13, wherein:
when the video conference is concluded, the server is further configured to convert recordings of the video conference and the guidance information into a new procedure script to be stored in the workflow database; and
the intelligent monitor device is capable of recording sensor value changes in the subject device during the video conference, and using a machine learning algorithm to learn fault state correlations.

* * * * *